US008607821B2

(12) United States Patent
Miki

(10) Patent No.: US 8,607,821 B2
(45) Date of Patent: Dec. 17, 2013

(54) STACK VALVE

(75) Inventor: Takashi Miki, Kobe (JP)

(73) Assignee: Nabtesco Corporation, Tokyo (JP)

( * ) Notice: Subject to any disclaimer, the term of this patent is extended or adjusted under 35 U.S.C. 154(b) by 288 days.

(21) Appl. No.: 13/048,641

(22) Filed: Mar. 15, 2011

(65) Prior Publication Data

US 2011/0232787 A1 Sep. 29, 2011

(30) Foreign Application Priority Data

Mar. 29, 2010 (JP) ................................. 2010-075359

(51) Int. Cl.
*F16D 31/02* (2006.01)
*F15B 13/06* (2006.01)

(52) U.S. Cl.
USPC ............. 137/596.17; 60/422; 60/484; 91/444

(58) Field of Classification Search
USPC ........ 137/596.17, 596.2; 60/422, 484; 91/444
See application file for complete search history.

(56) References Cited

U.S. PATENT DOCUMENTS 7,549,241 B2 * 6/2009 Ioku et al. ....................... 37/348

FOREIGN PATENT DOCUMENTS

| | | |
|---|---|---|
| JP | 01137023 A | 5/1989 |
| JP | 2009-299852 | 12/2009 |
| WO | 2009/154140 | 12/2009 |

OTHER PUBLICATIONS espacenet patent abstract for Japanese Publication No. 2009299852, Publication date Dec. 24, 2009 (1 page).

Office Action Issued in Japanese Application No. 2010-075359, Dated Aug. 6, 2013 (5 pages With English Translation).

* cited by examiner

*Primary Examiner* — Craig Schneider
(74) *Attorney, Agent, or Firm* — Osha Liang LLP

(57) ABSTRACT

A stack valve 1 includes a boom direction switching valve 11 (first direction switching valve) connected to an unloading path 21 and a service valve 13 (second direction switching valve) connected to the unloading path 21 at the downstream of the boom direction switching valve 11. At changeover positions **11*a* and 11*c* at which the unloading path 21 on the upstream side is connected to one of the supply and discharge paths 29 and 30 and the other one of the supply and discharge paths 29 and 30 is connected to the unloading path 21 on the downstream side, the boom direction switching valve 11 is connected to a boom valve tank return path 27 which connects the other one of the supply and discharge paths 29 and 30 with the tank path 22**.

3 Claims, 2 Drawing Sheets

STACK VALVE

CROSS REFERENCE TO RELATED APPLICATION

The present application claims priority from Japanese Patent Application No. 2010-075359, which was filed on Mar. 29, 2010, the disclosure of which is herein incorporated by reference in its entirety.

BACKGROUND OF THE INVENTION

The present invention relates to a stack valve mainly used in construction machines and controlling a plurality of actuators.

An example of such a technology is recited in Patent Document 1. A stack valve recited in Patent Document 1 is a stack valve having a bucket parallel movement function of keeping a bucket in parallel to the horizontal plane when a boom is driven by supplying a pressure fluid to a boom cylinder, by supplying a return pressure fluid from a bucket cylinder to the boom cylinder.

Patent Documents

[Patent Document 1] Japanese Unexamined Patent Publication No. 2009-299852

SUMMARY OF THE INVENTION

The stack valve of Patent Document 1 is disadvantageous in that, provided that an operator operates the service valve 13 to activate an attachment connected to the service valve 13 via an actuator and then the attachment is stopped for reasons such as physical contact with an object, the boom and the bucket do not move even if the boom direction switching valve 11 and the bucket direction switching valve 12 are operated.

When the attachment is stopped as above, the boom and the bucket become movable again after the operator returns the service valve 13 to its neutral position. The operationality is poor in this case, because the boom and the bucket do not return to be movable unless the service valve 13 is returned to the neutral position.

The present invention was done to solve the problem above, and an objective of the invention is to provide a stack valve having a plurality of serially-connected direction switching valves, which allows an actuator which is connected to a direction switching valve on the upstream side to be operable even if the direction switching valve is not returned to the neutral position, when an actuator connected to the direction switching valve on the downstream side is stopped due to reasons such as overload.

To achieve the objective above, the present invention provides a stack valve including: an unloading path connected to a hydraulic pump; a tank path connected to a tank; a first direction switching valve connected to the unloading path and controlling supply of a pressure fluid from the hydraulic pump to a first actuator; a pair of first supply and discharge paths connecting the first direction switching valve with the first actuator; a second direction switching valve connected to the unloading path at the downstream of the first direction switching valve and controlling supply of the pressure fluid from the hydraulic pump to a second actuator; and a pair of second supply and discharge paths connecting the second direction switching valve with the second actuator, wherein, the pressure fluid returns from the first supply and discharge paths to the unloading path when the first actuator is activated, the first direction switching valve has a changeover position at which the unloading path on the upstream of the first direction switching valve is connected with one of the first supply and discharge paths and the other one of the first supply and discharge path is connected with the unloading path on the downstream of the first direction switching valve and the tank path, and a tank return path connecting the other one of the first supply and discharge paths with the tank path is connected to the first direction switching valve.

According to this arrangement, when the first direction switching valve is operated after the second actuator is stopped for reasons such as overload while the second direction switching valve is being operated, the pressure fluid, which returns to the unloading path on the downstream of the first direction switching valve before the stop, returns to the tank via the tank return path. As a result, the pressure fluid flows through the first direction switching valve and hence the first actuator is operated.

According to the second aspect, the present invention provides a stack valve including: an unloading path connected to a hydraulic pump; a tank path connected to a tank; a first direction switching valve connected to the unloading path and controlling supply of a pressure fluid from the hydraulic pump to a first actuator; a pair of first supply and discharge paths connecting the first direction switching valve with the first actuator; a second direction switching valve connected to the unloading path at the downstream of the first direction switching valve and controlling supply of the pressure fluid from the hydraulic pump to a second actuator; a pair of second supply and discharge paths connecting the second direction switching valve with the second actuator; a third direction switching valve connected to the unloading path at the downstream of the first direction switching valve and upstream of the second direction switching valve and controlling supply of the pressure fluid from the hydraulic pump to a third actuator; a pair of third supply and discharge paths connecting the third direction switching valve with the third actuator; and a splitter which distributes the pressure fluid returning from the first actuator to the first supply and discharge path between the unloading path on the downstream of the first direction switching valve and one of the third supply and discharge paths, and connects or disconnects the other one of the third supply and discharge paths with or from the unloading path, wherein, the pressure fluid returns from the first supply and discharge paths to the unloading path when the first actuator is activated, whereas the pressure fluid returns from the third supply and discharge paths to the unloading path when the third actuator is activated, and the splitter includes a tank return path which allows the pressure fluid, which is arranged to return to the unloading path on the downstream of the first direction switching valve, to return to the tank path.

According to this arrangement, when the first direction switching valve is operated after the second actuator is stopped for reasons such as overload while the second direction switching valve is being operated, the pressure fluid, which returns to the unloading path on the downstream of the first direction switching valve before the stop, returns to the tank via the tank return path. As a result, the pressure fluid flows through the first direction switching valve and hence the first actuator is operated.

In addition to the above, the present invention is preferably arranged so that the splitter includes: a splitting valve which distributes the pressure fluid returning from the first actuator to the first supply and discharge paths between the unloading path on the downstream of the first direction switching valve and one of the third supply and discharge paths; and a sequence valve which connects or disconnects the unloading path on the downstream of the first direction switching valve with or from the one other one of the third supply and discharge paths, and the sequence valve has a changeover position at which the unloading path on the downstream of the first direction switching valve and the tank path are connected to the other one of the third supply and discharge paths.

According to this arrangement, when the first direction switching valve is operated after the second actuator is stopped for reasons such as overload while the second direction switching valve is being operated, the pressure fluid, which returns to the unloading path on the downstream of the first direction switching valve before the stop, returns to the tank via the tank return path. As a result, the pressure fluid flows through the first direction switching valve and hence the first actuator is operated.

The stack valve of the present invention allows an actuator connected to a direction switching valve on the upstream side to be operable when an actuator connected to a direction switching valve on the downstream side is stopped for reasons such as overload, even if this direction switching valve is not returned to the neutral position by the operator.

DESCRIPTION OF THE PREFERRED EMBODIMENTS

The following will describe an embodiment of the present invention with reference to figures.

First Embodiment (Structure of Stack Valve)

Figure 1:
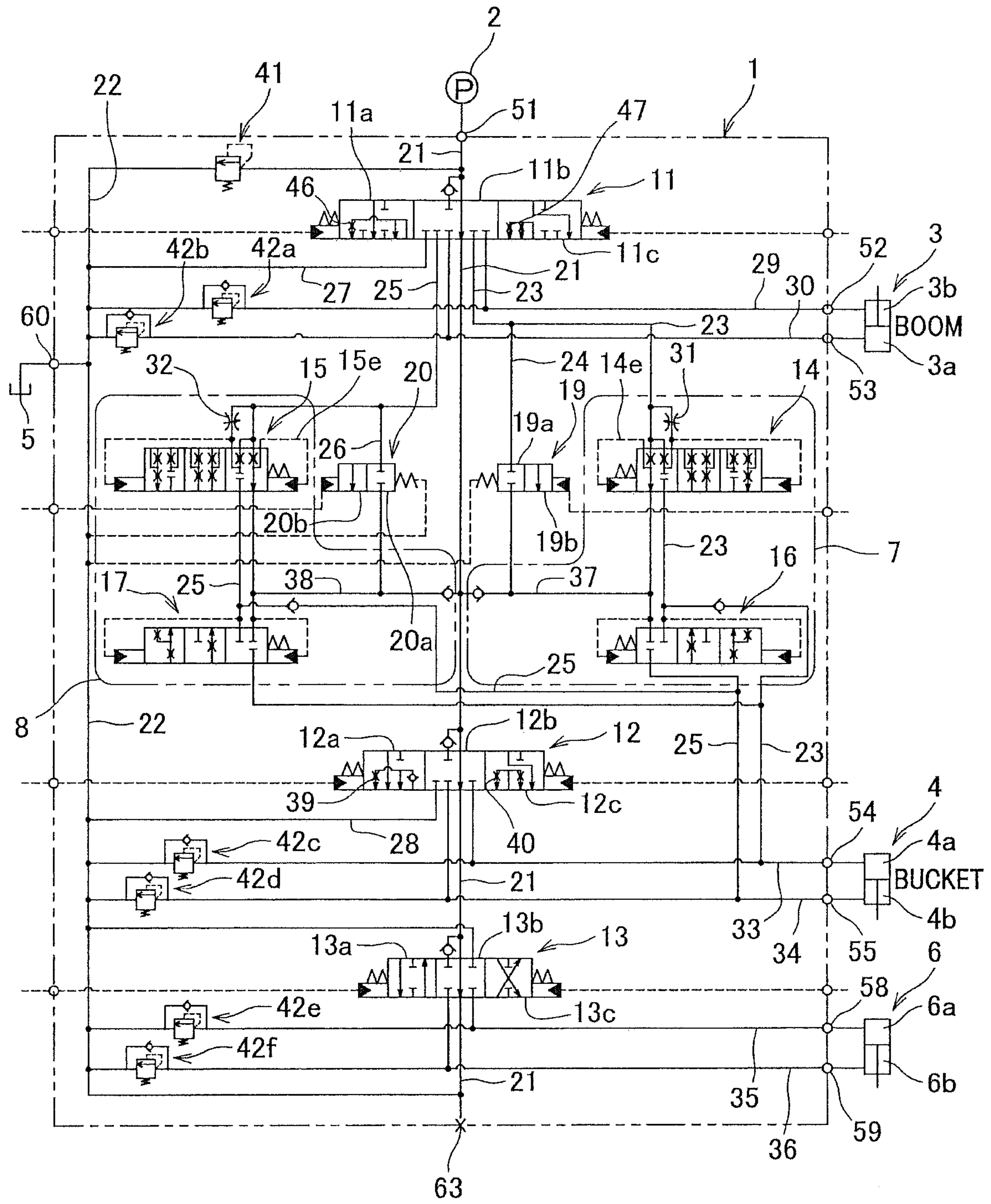
FIG. 1 is a hydraulic circuit diagram showing a stack valve according to First Embodiment of the present invention.

Referring to FIG. 1, a stack valve 1 according to First Embodiment of the present invention will be described. The stack valve 1 is a stack valve having a bucket parallel movement function and is chiefly used for construction machines such as loaders (not illustrated). Such a loader is provided with hydraulically operated components such as a boom (not illustrated) capable of moving up and down and attached to the front part of the loader and a bucket (not illustrated) which is attached to the leading end of the boom. The boom is moved by the boom cylinder 3. This boom is raised when a pressure fluid is supplied to a head-side chamber 3*a* of a boom cylinder 3 and is lowered when a pressure fluid is supplied to a rod-side chamber 3*b*. The bucket is moved by the bucket cylinder 4. The bucket performs dumping (forward tilting) as a pressure fluid is supplied to a head-side chamber 4*a* of a bucket cylinder 4, and is moved in the scooping direction (backward tilting) as a pressure fluid is supplied to a rod-side chamber 4*b*.

It is noted that the boom cylinder 3 and the bucket cylinder 4 are both equivalent to a first actuator recited in claim 1 of the present invention. The bucket cylinder 4 is also equivalent to a third actuator recited in claim 2 of the present invention.

As shown in FIG. 1, the stack valve 1 includes a boom direction switching valve 11, a bucket direction switching valve 12, a service valve 13, an ascending splitting valve 14, an ascending cancellation switching valve 19, a descending splitting valve 15, a descending cancellation switching valve 20, an ascending sequence valve 16, and a descending sequence valve 17. The stack valve 1 is connected to a hydraulic pump 2, a boom cylinder 3 which drives the boom, a bucket cylinder 4 which drives the bucket, an optional cylinder 6 driving an optional attachment (hydraulically operated component), and a tank 5 to which fluid returns, via a port 51, ports 52 and 53, ports 54 and 55, ports 58 and 59, and a port 60, respectively. In addition to these ports, the stack valve 1 further includes ports such as a port 63.

It is noted that the boom direction switching valve and the bucket direction switching valve 12 are equivalent to a first direction switching valve recited in claim 1 of the present invention, whereas the service valve 13 is equivalent to a second direction switching valve of the present invention. The optional cylinder 6 is equivalent to a second actuator of the present invention. The bucket direction switching valve 12 is also equivalent to a third direction switching valve recited in claim 2 of the present invention.

Furthermore, the hydraulic pump 2 is connected to an unloading path 21 via the port 51, and the tank 5 is connected to a tank path 22 via the port 60. The port 63 provided at the most downstream part of the unloading path 21 is connected in series to another direction switching valve (not illustrated) according to need.

(Boom Direction Switching Valve)

The boom direction switching valve 11 is connected to the unloading path 21 to control the supply of the pressure fluid from the hydraulic pump 2 to the boom cylinder 3. The boom direction switching valve 11 is connected to the boom cylinder 3 by a pair of supply and discharge paths 29 and 30 for the boom. The boom direction switching valve 11 is connected to a boom valve tank return path 27. The boom valve tank return path 27 is used for connecting one of the supply and discharge paths 29 and 30 with the tank path 22.

The boom direction switching valve 11 controls the supply and discharge (supply) of pressure fluid from the hydraulic pump 2 to the boom cylinder 3 by changing the relation of connections among the unloading path 21 on the upstream side, the pair of supply and discharge paths 29 and 30, and the unloading path 21 on the downstream side.

(Bucket Direction Switching Valve)

The bucket direction switching valve 12 is connected to the unloading path 21 at the downstream of the boom direction switching valve 11, and controls the supply of the pressure fluid from the hydraulic pump 2 to the bucket cylinder 4. The bucket direction switching valve 12 and the bucket cylinder 4 are connected with each other by a pair of supply and discharge paths 33 and 34 for the bucket. In addition to the above, the bucket direction switching valve 12 is connected to a bucket valve tank return path 28. The bucket valve tank return path 28 is a path to connect one of the supply and discharge paths 33 and 34 with the tank path 22.

The bucket direction switching valve 12 controls the supply and discharge (supply) of pressure fluid from the hydraulic pump 2 to the bucket cylinder 4 by changing the relation of connections among the unloading path 21 on the upstream side, the pair of supply and discharge paths 33 and 34, and the unloading path 21 on the downstream side.

(Service Valve)

The service valve 13 is connected to the unloading path 21 at the downstream of the bucket direction switching valve 12 and controls the supply of the pressure fluid from the hydraulic pump 2 to the optional cylinder 6. The service valve 13 and the optional cylinder 6 are connected with each other by a pair of supply and discharge paths 35 and 36 for the option.

The service valve 13 controls the supply and discharge (supply) of pressure fluid from the hydraulic pump 2 to the optional cylinder 6 by changing the relation of connections among the unloading path 21 on the upstream side, the pair of supply and discharge paths 35 and 36, and the tank path 22.

The boom direction switching valve 11, the bucket direction switching valve 12, and the service valve 13 are connected in series with one another by the unloading path 21. The above-described pair of supply and discharge paths 29 and 30 and pair of supply and discharge paths 33 and 34 are equivalent to a pair of first supply and discharge paths of the present invention, whereas the pair of supply and discharge paths 35 and 36 is equivalent to a pair of second supply and discharge paths of the present invention.

The boom direction switching valve 11 is connected to an ascending junction path 23. The ascending junction path 23 supplies a part of the return pressure fluid from the rod-side chamber 3*b* of the boom cylinder 3 to the head-side chamber 4*a* of the bucket cylinder 4 via the boom direction switching valve 11. The remaining part of the return pressure fluid which is not supplied to the head-side chamber 4*a* flows from an ascending return path 37 to the unloading path 21 on the downstream of the boom direction switching valve 11.

The ascending junction path 23 is provided with an ascending splitting valve 14 which controls the flow rate of the pressure fluid supplied to the head-side chamber 4*a* of the bucket cylinder 4. The ascending junction path 23 on the upstream of the ascending splitting valve 14 is provided with a variable throttle 31, and this variable throttle 31 and a throttle of the ascending splitting valve 14 adjust the split ratio between the flow rate of the pressure fluid supplied to the head-side chamber 4*a* of the bucket cylinder 4 and the flow rate of the pressure fluid flowing into the unloading path 21.

The ascending splitting valve 14 distributes the pressure fluid returning from the boom cylinder 3 to the supply and discharge path 29 between the unloading path 21 on the downstream of the boom direction switching valve 11 and the supply and discharge path 33.

The stack valve 1 is further provided with an ascending branched path 24 branching from the ascending junction path 23 and connected to the unloading path 21 via the ascending return path 37. This ascending branched path 24 is provided with an ascending cancellation switching valve 19 which opens or closes the ascending branched path 24. The ascending cancellation switching valve 19 closes the ascending branched path 24 when the valve is at a leveling active position 19*a*, and opens the ascending branched path 24 when the valve is at a leveling cancellation position 19*b*.

The descending junction path 25 on the downstream of the ascending splitting valve 14 is connected to an ascending sequence valve 16. The ascending sequence valve is provided for improving the accuracy of the bucket parallel movement, and controls the flow rate of the pressure fluid flowing out from the rod-side chamber 4*b* of the bucket cylinder 4.

The ascending sequence valve 16 controls so as to connect or disconnect the unloading path 21 on the downstream of the boom direction switching valve 11 with or from the supply and discharge path 34.

The ascending splitting valve 14 and the ascending sequence valve 16 constitute an ascending splitter 7 (splitter). In FIG. 1, the ascending splitter 7 is circumscribed by a two-dot chain line.

The boom direction switching valve 11 is connected to the descending junction path 25. The descending junction path 25 supplies a part of the return pressure fluid from the head-side chamber 3*a* of the boom cylinder 3 to the rod-side chamber 4*b* of the bucket cylinder 4 via the boom direction switching valve 11. The remaining part of the return pressure fluid which is not supplied to the rod-side chamber 4*b* flows from a descending return path 38 to the unloading path 21 on the downstream of the boom direction switching valve 11.

The descending junction path 25 is provided with a descending splitting valve 15 which controls the flow rate of the pressure fluid supplied to the rod-side chamber 4*b* of the bucket cylinder 4. The descending junction path 25 on the upstream of the descending splitting valve 15 is provided with a variable throttle 32, and this variable throttle 32 and a throttle of the descending splitting valve 15 adjust the split ratio between the flow rate of the pressure fluid supplied to the rod-side chamber 4*b* of the bucket cylinder 4 and the flow rate of the pressure fluid flowing into the unloading path 21.

The descending splitting valve 15 distributes the pressure fluid returning from the boom cylinder 3 to the supply and discharge path 30 between the unloading path 21 on the downstream of the boom direction switching valve 11 and the supply and discharge path 34.

The stack valve 1 is further provided with a descending branched path 26 branching from the descending junction path 25 and connected to the unloading path 21 via the descending return path 38. This descending branched path 26 is provided with a descending cancellation switching valve 20 which opens or closes the descending branched path 26. The descending cancellation switching valve 20 blocks the descending branched path 26 when the valve is at the leveling active position 20*a*, and opens the descending branched path 26 when the valve is at the leveling cancellation position 20*b*.

The ascending junction path 23 on the downstream of the descending splitting valve 15 is provided with a descending sequence valve 17. This descending sequence valve 17 is provided for improving the accuracy of the bucket parallel movement and controls the flow rate of the pressure fluid flowing out from the head-side chamber 4*a* of the bucket cylinder 4.

The descending sequence valve 17 connects or disconnects the unloading path 21 on the downstream of the boom direction switching valve 11 with/from the supply and discharge path 33.

The descending splitting valve 15 and the descending sequence valve 17 constitute a descending splitter 8 (splitter). In FIG. 1, the descending splitter 8 is circumscribed by a two-dot chain line.

The paths inside the stack valve 1 have relief valves 41 and 42*a*-42*f* at predetermined positions, in order to adjust the pressure of the fluid in each path.

(Operation of Stack Valve)

Now, the operation of the stack valve 1 will be described. The boom direction switching valve 11 is structured to be switchable among three changeover positions, namely an ascending position 11*a*, a neutral position 11*b*, and a descending position 11*c*. At the neutral position 11*b*, the unloading path 21 is opened while the ascending junction path 23, the descending junction path 25, and the boom cylinder 3 are closed. At the ascending position 11*a*, the pressure fluid is supplied from the hydraulic pump 2 to the head-side chamber 3*a* of the boom cylinder 3, and the rod-side chamber 3*b* is connected to the ascending junction path 23. As a result of this, when the pressure fluid is supplied to the head-side chamber 3*a* of the boom cylinder 3 to raise the boom, the return pressure fluid is supplied to the head-side chamber 4*a* of the bucket cylinder 4 from the rod-side chamber 3*b* of the boom cylinder 3, and hence the bucket is kept to be in parallel to the horizontal plane. In so doing, a part of the pressure fluid from the supply and discharge path 29 returns to the unloading path 21 via the ascending return path 37.

It is noted that the ascending position 11*a* is a changeover position at which the unloading path 21 on the upstream of the boom direction switching valve 11 is connected to the supply and discharge path 30 and the supply and discharge path 29, the unloading path 21 on the downstream of the boom direction switching valve 11, and the boom valve tank return path 27 are connected. (This also holds true for the later-described scooping position 12*a* of the bucket direction switching valve 12.)

This bucket parallel movement function for the boom raising is activated when the ascending branched path 24 is closed, i.e. when the ascending cancellation switching valve 19 is at the leveling active position 19*a*. On the other hand, when the ascending cancellation switching valve 19 is switched to the leveling cancellation position 19*b*, the ascending branched path 24 is connected to the unloading path 21 and hence the pressure fluid pressure-supplied from the rod-side chamber 3*b* of the boom cylinder 3 to the ascending junction path 23 via the boom direction switching valve 11 flows out from the ascending branched path 24, with the result that the supply of the pressure fluid to the head-side chamber 4*a* of the bucket cylinder 4 is stopped. In short, the bucket parallel movement function is canceled.

When the boom direction switching valve 11 is switched to the descending position 11*c*, the pressure fluid is supplied from the hydraulic pump 2 to the rod-side chamber 3*b* of the boom cylinder 3, and the head-side chamber 3*a* is connected to the descending junction path 25. As a result, when the pressure fluid is supplied to the rod-side chamber 3*b* of the boom cylinder 3 so that the boom is lowered, the return pressure fluid is supplied to the rod-side chamber 4*b* of the bucket cylinder 4 from the head-side chamber 3*a* of the boom cylinder 3, and hence the bucket is kept to be in parallel to the horizontal plane. In so doing, a part of the pressure fluid from the supply and discharge path 30 returns to the unloading path 21 via the descending return path 38.

It is noted that the descending position 11*c* is a changeover position at which the unloading path 21 on the upstream of the boom direction switching valve 11 is connected to the supply and discharge path 29 whereas the supply and discharge path 30, the unloading path 21 on the downstream of the boom direction switching valve 11, and the boom valve tank return path 27 are connected. (The same applies to a later-described bucket direction switching valve 12 of the dumping position 12*c*.)

The bucket parallel movement function when the boom is lowered is activated when the descending branched path is blocked, i.e. when the descending cancellation switching valve 20 is at the leveling active position 20*a*. On the other hand, when the descending cancellation switching valve 20 is switched to the leveling cancellation position 20*b*, the descending branched path 26 is connected to the unloading path 21 and hence the pressure fluid pressure-supplied from the head-side chamber 3*a* of the boom cylinder 3 to the descending junction path 25 via the boom direction switching valve 11 flows out from the descending branched path 26, with the result that the supply of the pressure fluid to the rod-side chamber 4*b* of the bucket cylinder 4 is stopped. In short, the bucket parallel movement function is canceled.

In the meanwhile, the bucket direction switching valve 12 is switchable among three changeover positions, namely a scooping position 12*a*, a neutral position 12*b*, and a dumping position 12*c*. At the scooping position 12*a*, the rod-side chamber 4*b* of the bucket cylinder 4 is connected to the hydraulic pump 2 whereas the head-side chamber 4*a* is connected to the unloading path 21, so that the bucket is moved in the scooping direction. At the neutral position 12*b*, the unloading path 21 is connected. At the dumping position 12*c*, the head-side chamber 4*a* is connected to the hydraulic pump 2 whereas the rod-side chamber 4*b* is connected to the unloading path 21, to cause the bucket to perform dumping.

The service valve 13 is switchable among three changeover positions, namely a first changeover position 13*a*, a neutral position 13*b*, and a second changeover position 13*c*. At the first changeover position 13*a*, the rod-side chamber 6*b* of the optional cylinder 6 is connected to the hydraulic pump 2 whereas the head-side chamber 6*a* is connected to the tank path 22, with the result that the optional attachment is moved in a predetermined scooping direction. At the neutral position 13*b*, the unloading path 21 is connected. At the second changeover position 13*c*, the head-side chamber 6*a* is connected to the hydraulic pump 2 whereas the rod-side chamber 6*b* is connected to the tank path 22, with the result that the optional attachment is moved in the predetermined scooping direction.

Now, assume that the operator operates the service valve 13 so that the optional attachment is moved via the cylinder 6, and the attachment is stopped for reasons such as physical contact with an object (i.e. the optional cylinder 6 is stopped). In such a case, when the boom direction switching valve 11 is operated, the pressure fluid, which is arranged to return to the unloading path via the ascending return path 37 or the descending return path 38 before the stop of the cylinder 6, returns to the tank 5 via the boom valve tank return path 27 connected to the boom direction switching valve 11. As a result, the pressure fluid flows through the boom direction switching valve 11 and hence the boom cylinder 3 is operated.

The same applies to the bucket cylinder 4. That is to say, when the bucket direction switching valve 12 is operated, the pressure fluid, which is arranged to return to the unloading path 21 before the stop, returns to the tank 5 via the bucket valve tank return path 28 connected to the bucket direction switching valve 12. As a result, the pressure fluid flows through the bucket direction switching valve 12 and hence the bucket cylinder 4 is operated.

It is noted that the boom cylinder 3 and the bucket cylinder 4 are maintained to be operable while the bucket parallel movement function is kept active even if the optional cylinder 6 is stopped, because throttles 46 and 47 are provided on a path in the boom direction switching valve 11 connected to the boom valve tank return path 27 and throttles 39 and 40 are provided on a path in the bucket direction switching valve 12 connected to the bucket valve tank return path 28.

Second Embodiment

Figure 2:
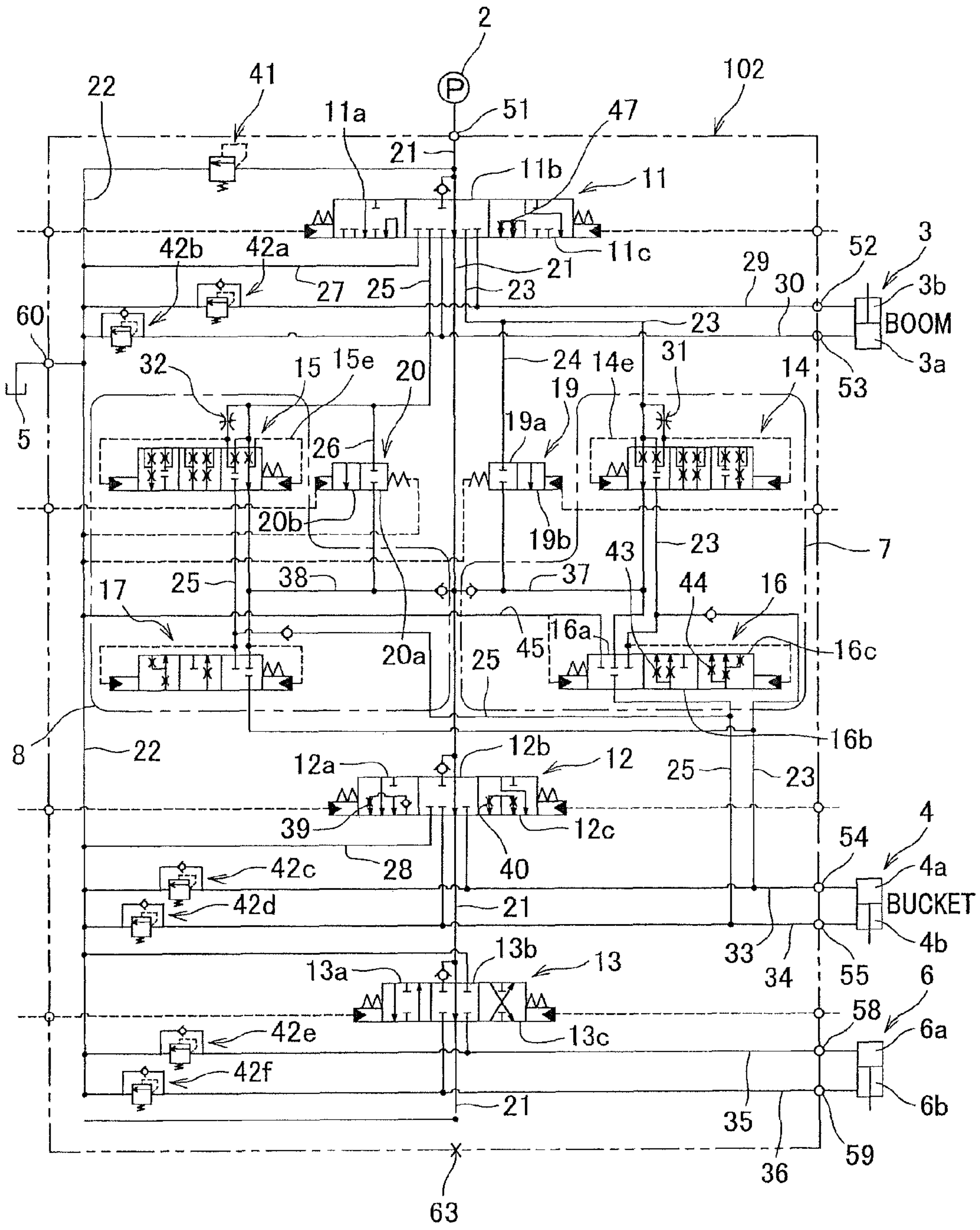
FIG. 2 is a hydraulic circuit diagram showing a stack valve according to Second Embodiment of the present invention.

FIG. 2 is a hydraulic circuit diagram showing a stack valve 102 according to Second Embodiment of the present invention. The stack valve 1 of First Embodiment and the stack valve 102 of the present embodiment are different from each other in the structure of the ascending position 11*a* of the boom direction switching valve 11 and the structure of the ascending sequence valve 16.

In the present embodiment, the return pressure fluid from the supply and discharge path 29 does not flow into the tank path 22 even if the boom direction switching valve 11 is switched to the ascending position 11*a*.

The ascending sequence valve 16 of the present embodiment has changeover positions 16*b* and 16*c* at which the supply and discharge path 34 is connected to the ascending return path 37 (i.e. the unloading path 21 on the downstream of the boom direction switching valve 11) and the tank path 22. The ascending sequence valve 16 is connected to a sequence valve tank return path 45.

With this structure, when the boom direction switching valve 11 is operated after the optional cylinder 6 is stopped on account of overload or the like while the service valve 13 is being operated, the pressure fluid, which is arranged to return to the unloading path 21 on the downstream of the boom direction switching valve 11 before the stop of the cylinder 6, returns to the tank 5 via the sequence valve tank return path 45. As a result, the pressure fluid flows through the boom direction switching valve 11 and hence the boom cylinder 3 is operated.

It is noted that the boom cylinder 3 and the bucket cylinder 4 are maintained to be operable while the bucket parallel movement function is kept active even if the optional cylinder 6 is stopped, because throttles 43 and 44 are provided on a path in the ascending sequence valve 16 connected to the sequence valve tank return path 45.

In the present embodiment, the boom direction switching valve 11, the service valve 13, and the bucket direction switching valve 12 are equivalent to the first direction switching valve, the second direction switching valve, and the third direction switching valve of the present invention, respectively. In addition to the above, the boom cylinder 3, the optional cylinder 6, and the bucket cylinder 4 are equivalent to the first actuator, second actuator, and the third actuator of the present invention, respectively. In addition to the above, the pair of supply and discharge paths 29 and 30, the pair of supply and discharge paths 35 and 36, and the pair of supply and discharge paths 33 and 34 are equivalent to a pair of first supply and discharge paths, a pair of second supply and discharge paths, and a pair of third supply and discharge paths of the present invention, respectively.

While a preferred embodiment of this invention has been described, it is to be distinctly understood that the invention is not limited thereto but may be otherwise variously embodied within the scope of the claims.

For example, Second Embodiment is arranged so that the sequence valve tank return path 45 is provided in the ascending sequence valve 16 of the ascending splitter 7. In this regard, a tank return path may be provided in the ascending splitting valve 14 of the ascending splitter 7 so that the pressure fluid, which is arranged to return to the unloading path 21 before the stop, returns to the tank via the tank return path in the ascending splitting valve 14.

In Second Embodiment, furthermore, the ascending position 11*a* and the descending position 11*c* may be replaced with each other in the boom direction switching valve 11, and also the ascending sequence valve 16 and the descending sequence valve 17 may be replaced with each other.

In addition to the above, although the stack valve having the bucket parallel movement function has been described, the present invention is applicable also for stack valves not having the bucket parallel movement function.

What is claimed is:

1. A stack valve comprising:

an unloading path connected to a hydraulic pump;

a tank path connected to a tank;

a first direction switching valve connected to the unloading path and controlling supply of a pressure fluid from the hydraulic pump to a first actuator;

a pair of first supply and discharge paths connecting the first direction switching valve with the first actuator;

a second direction switching valve connected to the unloading path at the downstream of the first direction switching valve and controlling supply of the pressure fluid from the hydraulic pump to a second actuator;

a pair of second supply and discharge paths connecting the second direction switching valve with the second actuator; and a tank return path connecting the first direction switching valve with the tank path, wherein the pressure fluid returns from the first supply and discharge paths to the unloading path when the first actuator is activated, and the first direction switching valve has a changeover position at which the unloading path on the upstream of the first direction switching valve is connected with one of the first supply and discharge paths and the other one of the first supply and discharge path is connected with the unloading path on the downstream of the first direction switching valve and the tank return path.

2. A stack valve comprising:

an unloading path connected to a hydraulic pump;

a tank path connected to a tank;

a first direction switching valve connected to the unloading path and controlling supply of a pressure fluid from the hydraulic pump to a first actuator;

a pair of first supply and discharge paths connecting the first direction switching valve with the first actuator;

a second direction switching valve connected to the unloading path at the downstream of the first direction switching valve and controlling supply of the pressure fluid from the hydraulic pump to a second actuator;

a pair of second supply and discharge paths connecting the second direction switching valve with the second actuator;

a third direction switching valve connected to the unloading path at the downstream of the first direction switching valve and upstream of the second direction switching valve and controlling supply of the pressure fluid from the hydraulic pump to a third actuator;

a pair of third supply and discharge paths connecting the third direction switching valve with the third actuator; and a splitter which distributes the pressure fluid returning from the first actuator to the first supply and discharge paths between the unloading path on the downstream of the first direction switching valve and one of the third supply and discharge paths, and connects or disconnects the other one of the third supply and discharge paths with or from the unloading path, wherein, the pressure fluid returns from the first supply and discharge paths to the unloading path when the first actuator is activated, whereas the pressure fluid returns from the third supply and discharge paths to the unloading path when the third actuator is activated, and the splitter includes a tank return path which allows the pressure fluid, which is arranged to return to the unloading path on the downstream of the first direction switching valve, to return to the tank path.

3. The stack valve according to claim 2, wherein, the splitter includes:

a splitting valve which distributes the pressure fluid returning from the first actuator to the first supply and discharge paths between the unloading path on the downstream of the first direction switching valve and one of the third supply and discharge paths; and a sequence valve which connects or disconnects the unloading path on the downstream of the first direction switching valve with or from the one other one of the third supply and discharge paths, and the sequence valve has a changeover position at which the unloading path on the downstream of the first direction switching valve and the tank path are connected to the other one of the third supply and discharge paths.

* * * * *